United States Patent
Discekici et al.

(10) Patent No.: US 12,441,057 B2
(45) Date of Patent: Oct. 14, 2025

(54) THREE-DIMENSIONAL PRINTING WITH NATURAL FOOD-DERIVED FUSING COMPOUNDS

(71) Applicant: PERIDOT PRINT LLC, Palo Alto, CA (US)

(72) Inventors: Emre Hiro Discekici, San Diego, CA (US); Krzysztof Nauka, Palo Alto, CA (US)

(73) Assignee: Peridot Print LLC, Palo Alto, CA (US)

( * ) Notice: Subject to any disclaimer, the term of this patent is extended or adjusted under 35 U.S.C. 154(b) by 196 days.

(21) Appl. No.: 18/029,603

(22) PCT Filed: Oct. 21, 2020

(86) PCT No.: PCT/US2020/056565
§ 371 (c)(1),
(2) Date: Mar. 30, 2023

(87) PCT Pub. No.: WO2022/086510
PCT Pub. Date: Apr. 28, 2022

(65) Prior Publication Data
US 2023/0356463 A1    Nov. 9, 2023

(51) Int. Cl.
*B29C 64/165*    (2017.01)
*B33Y 10/00*    (2015.01)
*B33Y 70/10*    (2020.01)

(52) U.S. Cl.
CPC ............ *B29C 64/165* (2017.08); *B33Y 10/00* (2014.12); *B33Y 70/10* (2020.01)

(58) Field of Classification Search
None
See application file for complete search history.

(56) References Cited

U.S. PATENT DOCUMENTS

| 7,597,752 | B2 | 10/2009 | Shastry et al. |
| 8,167,990 | B2 | 5/2012 | De Saint-Romain |
| 9,226,513 | B2 | 1/2016 | Ream et al. |
| 11,987,653 | B1* | 5/2024 | Long .................... B33Y 70/00 |
| 2002/0026886 | A1* | 3/2002 | Isager .................... C09C 3/00 |
| | | | 106/471 |

(Continued)

FOREIGN PATENT DOCUMENTS

CN    107700238 A    2/2018

OTHER PUBLICATIONS

Lee, M. J., et al., "Curcumin-loaded biodegradable polyurethane scaffolds modified with gelatin using 3D printing technology for cartilage tissue engineering", Polymers Advanced Technologies, Jul. 18, 2019, pp. 3083-3090.

(Continued)

*Primary Examiner* — Jeffrey M Wollschlager
(74) *Attorney, Agent, or Firm* — Dierker & Kavanaugh, P.C.

(57) ABSTRACT

A three-dimensional printing kit can include a build material and a fusing agent. The build material can include from about 80 wt % to 100 wt % polymeric particles having a D50 particle size from about 10 μm to about 150 μm. The fusing agent can include an aqueous liquid vehicle and natural food-derived fusing compound dissolved or dispersed therein. The natural food-derived fusing compound can have an absorption peak from about 340 nm to about 780 nm.

15 Claims, 3 Drawing Sheets

(56) References Cited

U.S. PATENT DOCUMENTS

| | | | |
|---|---|---|---|
| 2008/0032011 A1 | 2/2008 | Liniger et al. | |
| 2016/0330992 A1* | 11/2016 | Von Hasseln | A23P 30/00 |
| 2017/0260653 A1* | 9/2017 | Ahn | D01F 1/10 |
| 2017/0266881 A1* | 9/2017 | Noort | A23G 3/54 |
| 2019/0147585 A1* | 5/2019 | Hartman | B33Y 50/02 |
| | | | 382/141 |
| 2019/0200660 A1* | 7/2019 | Miyamoto | A61K 47/36 |
| 2019/0240898 A1* | 8/2019 | Chaffins | B29C 64/255 |
| 2021/0371597 A1* | 12/2021 | Potkay | G03F 7/105 |
| 2023/0263208 A1* | 8/2023 | Aiso | A23L 5/30 |
| | | | 426/248 |

OTHER PUBLICATIONS

Tagami, T. et al., "3D Printing Factors Important for the Fabrication of Polyvinylalcohol Filament-Based Tablets", Biol. Pharm. Bull., vol. 40, Issue 3, 2017, pp. 357-364.

\* cited by examiner

THREE-DIMENSIONAL PRINTING WITH NATURAL FOOD-DERIVED FUSING COMPOUNDS

BACKGROUND

Methods of three-dimensional (3D) digital printing, a type of additive manufacturing, have continued to be developed over the last few decades. In general, 3D printing technology can change the product development cycle by allowing rapid creation of prototype models or even finished products. For example, several commercial sectors such as aviation and the medical industry, to name a few, have benefitted from rapid prototyping and/or the production of customized parts. There are various methods for 3D printing that have been developed, including heat-assisted extrusion, selective laser sintering, photolithography, additive manufacturing, as well as others. As technology advances, higher demands with respect to production speed, part consistency, rigidity, method flexibility, etc., are requested by customers.

DETAILED DESCRIPTION

The present disclosure is drawn to three-dimensional (3D) printing kits, systems, and methods for three-dimensional printing. More particularly, the three-dimensional printing kits can be used with multi-jet fusion (MJF) where polymeric particles of a build material can be spread on a powder bed on a layer by layer basis. The various layers can be selectively contacted with jetting fluid(s) which can include a radiation absorber. The jetting fluid(s) can be ejected from a print head, such as a fluid ejector similar to an inkjet print head, for example, and then the layer can be exposed to electromagnetic radiation to heat the layer of the build material. The radiation absorber can absorb the electromagnetic radiation and emit heat to the surrounding polymeric particles thereby fusing the adjacent polymeric particles to one another. This can be repeated layer by layer until a three-dimensional object is formed.

In accordance with this, the present disclosure is drawn to a three-dimensional printing kit. The three-dimensional printing kit can include a build material and a fusing agent. The build material can include from about 80 wt % to 100 wt % polymeric particles having a D50 particle size from about 10 µm to about 150 µm. The fusing agent can include an aqueous liquid vehicle and natural food-derived fusing compound dissolved or dispersed therein. The natural food-derived fusing compound can have an absorption peak from about 340 nm to about 780 nm. In one example, the polymeric particles can include polyacetal, polyacrylate, polybutylene terephthalate, polycarbonate, polyester, polyether ketone, polyethylene terephthalate, polyethylene, polypropylene, polystyrene, polyurethane, thermoplastic polyurethane, thermoplastic polyamides, a copolymer thereof, or a mixture thereof. In another example, the natural food-derived fusing compound can have an absorbance larger than 0.3. In yet another example, the natural food-derived fusing compound can be in the form of dispersed particles having a D50 particle size from about 10 nm to about 5 µm. In a further example, the natural food-derived fusing compound can include allspice, annatto, basil, basil, berbere, black garlic, brown sugar, caraway seeds, cardamom, carrot juice, cayenne red pepper, celery seeds, chili powder, cinnamon, cloves, coffee grinds, coriander, cranberry juice, cumin, curcumin, curry powder, ginger, ground mustard, ground peppercorns, ground sage, ground tea leaves, ground thyme, keratin, mace, marjoram, mustard seeds, mustard seeds, nutmeg, oregano, paprika, red pepper, sage, star anise, squid ink, tabil, turmeric, or a combination thereof. In one example, the natural food-derived fusing compound can include coffee grinds, curcumin, turmeric, or a combination thereof. In another example, the fusing agent can include from about 60 wt % to about 94 wt % water, from about 5 wt % to about 35 wt % organic co-solvent, and from about 0.1 wt % to about 20 wt % of the natural food-derived fusing compound. In yet another example, the aqueous liquid vehicle can include water and organic co-solvent. The organic co-solvent can consists of food additive permitted carrier solvents. In a further example, the three-dimensional printing kit can further include a detailing agent comprising a detailing compound. The detailing compound can reduce a temperature of the build material onto which the detailing agent is applied.

Also presented herein is a method for three-dimensional printing. The method of three-dimensional printing can include iteratively applying individual build material layers of a polymer build material including from about 80 wt % to 100 wt % polymeric particles having a D50 particle size from about 10 µm to about 150 µm to a powder bed; based on a three-dimensional object model, iteratively and selectively dispensing a fusing agent onto the individual build material layers, wherein the fusing agent includes an aqueous liquid vehicle and a natural food-derived fusing compound having an absorption peak from about 340 nm to about 780 nm; and iteratively exposing the powder bed to energy to selectively fuse the polymeric particles in contact with the natural food-derived fusing compound at the individual build material layers resulting in a fused three-dimensional object. In an example, the method can further include milling a food source of the natural food-derived fusing compound to have a D50 particle size from about 10 nm to about 5 µm, and dispersing or dissolving the natural food-derived fusing compound in the aqueous liquid vehicle to form the fusing agent. In another example, the method can further include holding the polymer build material at an elevated temperature less than the melting temperature of the polymeric particles to remove volatile fusing agent components applied thereon during printing. In yet another example, the method can result in a fused three-dimensional object suitable for direct food contact.

In another example, a multi-fluid kit can include a fusing agent and a second fluid agent. The fusing agent can include an aqueous liquid vehicle and a natural food-derived fusing compound having an absorption peak from about 340 nm to about 780 nm. The second fluid agent can be a coloring agent that includes a liquid vehicle and a colorant, or can be a detailing agent that includes a detailing compound that reduces a temperature of the build material onto which the detailing agent is applied. In this example, the detailing compound can reduce a temperature of the build material onto which the detailing agent is applied. In one example, the natural food-derived fusing compound can include allspice, annatto, basil, basil, berbere, black garlic, brown sugar, caraway seeds, cardamom, carrot juice, cayenne red pepper, celery seeds, chili powder, cinnamon, cloves, coffee grinds, coriander, cranberry juice, cumin, curcumin, curry powder, ginger, ground mustard, ground peppercorns, ground sage, ground tea leaves, ground thyme, keratin, mace, marjoram, mustard seeds, mustard seeds, nutmeg, oregano, paprika, red pepper, sage, star anise, squid ink, tabil, turmeric, or a combination thereof.

It is noted that when discussing the three-dimensional printing kit, the method for three-dimensional printing, and the multi-fluid kit of the present disclosure, these discussions can be considered applicable to other examples, whether or not they are explicitly discussed in the context of that example. Thus, for example, in discussing a build material related to the three-dimensional printing kit, such disclosure is also relevant to and directly supported in context of the method for three-dimensional printing, the multi-fluid kit, and vice versa.

It is also understood that terms used herein will have the ordinary meaning in the relevant technical field unless specified otherwise. In some instances, there are terms defined more specifically throughout the specification or included at the end of the present specification, and thus, these terms have a meaning consistent with these more specific definitions.

Three-Dimensional Printing Kits

Figure 1:
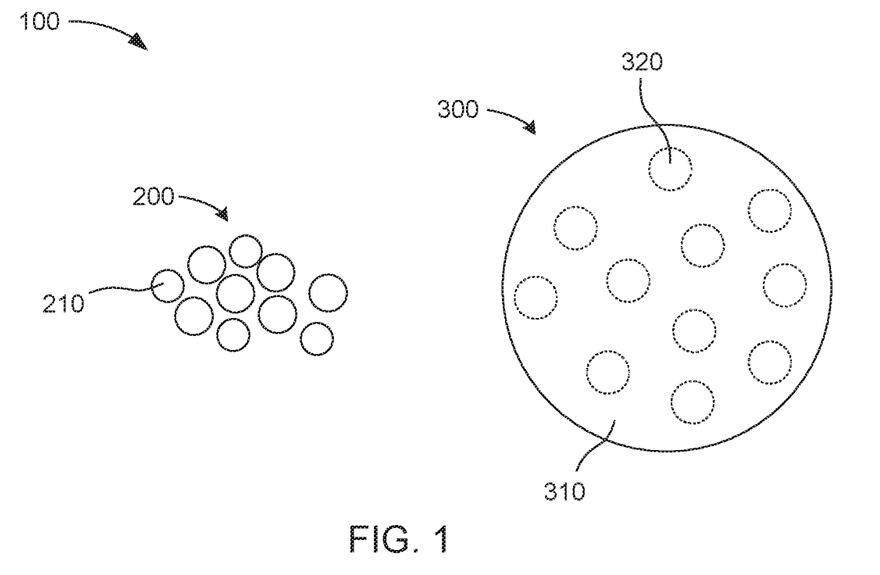
FIG. 1 schematically illustrates an example three-dimensional printing kit in accordance with the present disclosure.

Turning now to more detail regarding the three-dimensional printing kit as shown in FIG. 1 by example. The three-dimensional printing kit 100 can include a build material 200 including from about 80 wt % to 100 wt % polymeric particles 210 having a D50 particle size from about 10 µm to about 150 µm. The three-dimensional printing kit can further include a fusing agent 300 including an aqueous liquid vehicle 310 and natural food-derived fusing compound 320 dissolved or dispersed therein. The natural food-derived fusing compound can have an absorption peak from about 340 nm to about 780 nm.

In further detail regarding the build material 200, this can include from about 80 wt % to 100 wt % polymeric particles 210. In other examples, the polymeric particles can be present in the build material at from about 90 wt % to 100 wt %, from about 95 wt % to about 100 wt %, from about 80 wt % to about 90 wt %, from about 85 wt % to about 95 wt %. The polymeric particles can be selected from polyacetal, polyacrylate, polyamide, polybutylene terephthalate, polycarbonate, polyester, polyether ketone, polyethylene terephthalate, polyethylene, polypropylene, polystyrene, polyurethane, thermoplastic polyamides, thermoplastic polyurethane, copolymers thereof, blends of any of the multiple polymers listed herein, as well as mixtures thereof. In one example, the polymeric particles can include a polyamide, and the polyamide can be selected from polyamide-6, polyamide-9, polyamide-11, polyamide-12, polyamide-66, polyamide-612, or a combination thereof. In yet other examples, the polymeric particles can include a polyacrylate, polybutylene terephthalate, polycarbonate, polyester, polyethylene, polystyrene, polyurethane, copolymers thereof, blends of any of the multiple polymers listed herein, as well as mixtures thereof. Core shell polymer particles of these materials may also be used. In some examples, the build material can exclude amorphous materials.

The particles of the build material can have a D50 particle size that can range from about 10 µm to about 150 µm. Polymeric particles can have a D50 particle size that can range from about 10 µm to about 150 µm, from about µm to about 100 µm, from about 20 µm to about 80 µm, from about 30 µm to about 50 µm, from about 25 µm to about 75 µm, from about 40 µm to about 80 µm, from about 50 µm to about 75 µm, from about 75 µm to about 150 µm, from about 60 µm to about 90 µm, or from about 100 µm to about 150 µm, for example. The terms "size" or "particle size," as used herein, refer to the diameter of a substantially spherical particle, or the effective diameter of a non-spherical particle, e.g., the diameter of a sphere with the same mass and density as the non-spherical particle as determined by weight. Particle size information can be determined and/or verified using a scanning electron microscope (SEM), or can be measured using a particle analyzer such as a MASTERSIZER™ 3000 available from Malvern Panalytical, for example. The particle analyzer can measure particle size using laser diffraction. A laser beam can pass through a sample of particles and the angular variation in intensity of light scattered by the particles can be measured. Larger particles scatter light at smaller angles, while small particles scatter light at larger angles. The particle analyzer can then analyze the angular scattering data to calculate the size of the particles using the Mie theory of light scattering. Particle size can be reported as a volume equivalent sphere diameter. In some examples, an average particle size can refer to a mathematical average of the particle sizes, which is normally about the D50 particle size, but can be different depending on the particle size distribution.

That being stated, an example Gaussian-like distribution of the particles can be characterized generally using "D10," "D50," and "D90" particle size distribution values, where D10 refers to the particle size at the $10^{th}$ percentile, D50 refers to the particle size at the $50^{th}$ percentile, and D90 refers to the particle size at the $90^{th}$ percentile. For example, a D50 value of about 25 µm means that about 50% of the particles (by number) have a particle size greater than about 25 µm and about 50% of the particles have a particle size less than about 25 µm. Particle size distribution values are not necessarily related to Gaussian distribution curves. In practice, true Gaussian distributions are not typically present, as some skewing can be present, but still, the Gaussian-like distribution can be considered to be "Gaussian" as used in practice. Particle size distribution can be expressed in terms of D50 particle size, which can approximate average particle size, but may not be the same.

A shape of the particles of the build material can be spherical, irregular spherical, rounded, semi-rounded, discoidal, angular, subangular, cubic, cylindrical, or any combination thereof. In one example, the particles can include spherical particles, irregular spherical particles, or rounded particles. In some examples, the shape of the particles can be uniform or substantially uniform, which can allow for relatively uniform melting or sintering of the particles.

The polymeric particles in the build material can have a melting point that can range from about 75° C. to about 350° C., from about 100° C. to about 300° C., or from about 150° C. to about 250° C. As examples, the build material can be a polyamide having a melting point of about 170° C. to about 190° C., or a thermoplastic polyurethane that can have a melting point ranging from about 100° C. to about 165° C. A variety of thermoplastic polymers with melting points or softening points in these ranges can be used. In a specific example, the build material can include polyamide-12, which can have a melting point from about 175° C. to about 200° C.

The build material may include, in addition to the polymeric particles, a charging agent, a flow aid, or a combination thereof. Charging agent(s) may be added to suppress tribo-charging. Examples of suitable charging agent(s)

include aliphatic amines (which may be ethoxylated), aliphatic amides, quaternary ammonium salts (e.g., behentrimonium chloride or cocamidopropyl betaine), esters of phosphoric acid, polyethylene glycol esters, or polyols. Some suitable commercially available charging agents include HOSTASTAT® FA 38 (natural based ethoxylated alkylamine), HOSTASTAT® FE2 (fatty acid ester), and HOSTASTAT® HS 1 (alkane sulfonate), both from Clariant Int. Ltd. (North America). In an example, the charging agent can be added in an amount ranging from greater than 0 wt % to 5 wt % based upon the total wt % of the build material.

Flow aid(s) may be added to increase the coating flowability of the build material. Flow aid(s) may be particularly desirable when the particles of the build material are on the smaller end of the particle size range. The flow aid can increase the flowability of the build material by reducing friction, lateral drag, and tribocharge buildup (by increasing the particle conductivity). Examples of suitable flow aids include tricalcium phosphate (E341), powdered cellulose (E460(ii)), magnesium stearate (E470b), sodium bicarbonate (E500), sodium ferrocyanide (E535), potassium ferrocyanide (E536), calcium ferrocyanide (E538), bone phosphate (E542), sodium silicate (E550), silicon dioxide (E551), calcium silicate (E552), magnesium trisilicate (E553a), talcum powder (E553b), sodium aluminosilicate (E554), potassium aluminum silicate (E555), calcium aluminosilicate (E556), bentonite (E558), aluminum silicate (E559), stearic acid (E570), or polydimethylsiloxane (E900). In an example, the flow aid can be added in an amount ranging from greater than 0 wt % to less than 5 wt % based upon the total wt % of the build material.

In further detail regarding the fusing agent 300 that may be present in the three-dimensional printing kit 100, the three-dimensional printing system (shown by example at FIG. 2), or utilized in a method of three-dimensional printing (shown by example at FIG. 3) as described herein, during three-dimensional printing, a fusing agent 300 can be applied to the build material on a layer by layer basis and can move into vacant spaces between particles of the build material. The fusing agent can provide binding between polymeric particles after printing of the fusing agent and exposure to electromagnetic energy within the absorption spectrum of the natural food-derived fusing compound 320. The fusing agent can include an aqueous liquid 310 vehicle and the natural food-derived fusing compound dissolved or dispersed therein. The fusing compound may be present in the fusing agent at a concentration from about 0.1 wt % to about 20 wt %, from about 0.2 wt % to about 10 wt %, from about 0.3 wt % to about 8 wt %, or from about 0.2 wt % to about 5 wt %, for example.

The natural food-derived fusing compound can provide a boosting capacity sufficient to increase the temperature of the build material above the melting or softening point of the polymeric particles therein. As used herein, "temperature boosting capacity" refers to the ability of a natural food-derived fusing compound to convert ultraviolet or visible energy into thermal energy to increase the temperature of the polymeric particles of the build material over and above the temperature of the unprinted portion of the build material. Typically, the build material can be fused together when the temperature increases to or above the melting or softening temperature of a polymer of the polymeric particles, but fusion can also occur in some instance below the melting point. As used herein, "melting point" refers to the temperature at which a polymer transitions from a crystalline phase to a pliable, amorphous phase. Some polymers do not have a melting point, but rather have a range of temperatures over which the polymers soften. This range can be segregated into a lower softening range, a middle softening range, and an upper softening range. In the lower and middle softening ranges, the polymeric particles in contact with the natural food-derived fusing compound can coalesce to form a layer of a three-dimensional part while the remaining polymeric particles can remain loose.

The term "natural food-derived fusing compound" can include colorants and other solids, such as pigments and/or dyes, which may be derived from a natural food sources, either as a component of a natural food or extracted from a natural food. The natural food-derived fusing compounds of the present disclosure can exhibit an absorption peak from about 340 nm to about 780 nm, and thus, can be used as a fusing compound for three-dimensional printing in accordance with the present disclosure.

As used herein, "peak absorption" indicates that from about 70% to about 100% of light emitted at a specified wavelength range is absorbed by the natural food-derived fusing compound. In other examples, at least about 75%, at least about 80%, at least about 85%, at least about 90%, at least about 95%, or 100% of the light emitted at the wavelengths emitted by an energy source can be absorbed by the natural food-derived fusing compound. The natural food-derived fusing compound can exhibit absorption at other wavelengths within the wavelength range, or even beyond the recited wavelength range where "peak absorption" may occur; however, the natural food-derived fusing compound will exhibit at least one absorption peak of at least 50% absorption within the range of about 340 nm to about 780 nm.

As used herein, "absorbance" indicates the capacity of the natural food-derived fusing compound to absorb light, and can be measured using a UV-visible spectrophotometer such as Cary 5000 spectrometer, for example. In some examples, the natural food-derived fusing compound can have an absorbance greater than 0.3, and in other examples, the natural food-derived fusing compound can have an absorbance from about 0.3 to 3, or from about 0.3 to about 1, for example.

The natural food-derived fusing compound can include any of a number of natural food compounds can be prepared from various sources, such as allspice, annatto, basil, basil, berbere, black garlic, brown sugar, caraway seeds, cardamom, carrot juice, cayenne red pepper, celery seeds, chili powder, cinnamon, cloves, coffee grinds, coriander, cranberry juice, cumin, curcumin, curry powder, ginger, ground mustard, ground peppercorns, ground sage, ground tea leaves, ground thyme, keratin, mace, marjoram, mustard seeds, mustard seeds, nutmeg, oregano, paprika, red pepper, sage, star anise, squid ink, tabil, turmeric, or a combination thereof. In some examples, the natural food-derived fusing compound be sourced from coffee grinds, curcumin, turmeric, or a combination thereof. In a further example, the natural food-derived fusing compound can include coffee as its source. It is noted that when referring to a natural food-derived fusing compound being included in a fusing agent, it is understood to mean that the compound is sourced from the natural food, e.g., ground up in to particles, extracted from the natural food, or the like. The natural food-derived fusing compound may be water soluble or water insoluble.

In some examples, the natural food-derived fusing compound can be in the form of dispersed particles. The dispersed particles can be achieved by milling or grinding the natural food in a dispersant and an aqueous liquid vehicle. The dispersed particles can have a D50 particle size from about 10 nm to about 5 µm, in an example. In yet other examples, particle of the natural food-derived fusing compound can have a D50 particle size ranging from about 10 nm to about 100 nm, from about 200 nm to about 400 nm, from about 250 nm to about 500 nm, from about 10 nm to about 300 nm, from about 10 nm to about 90 nm, from about 50 nm to about 250 nm, from about 500 nm to about 1 µm, from about 200 nm to about 800 nm, from about 300 nm to about 600 nm, from about 750 nm to about 1 µm, from about 500 nm to about 5 µm, or from about 100 nm to about 2 µm.

The natural food-derived fusing compound can be dissolved or dispersed in an aqueous liquid vehicle suitable for jetting. In one example, the aqueous liquid vehicle, can include water as a major solvent, e.g., the solvent present at the highest concentration when compared to other co-solvents. The aqueous liquid vehicle can be present in the fusing agent at from about 75 wt % to about 99.9 wt %. Water may be included in the fusing agent at from about 50 wt % to about 99.9 wt %, from about 60 wt % to about 98 wt %, from about 60 wt % to about 95 wt %, or from about 50 wt % to about 85 wt %, based on a total weight of the fusing agent.

Apart from water, the aqueous liquid vehicle may further include an organic co-solvent. The organic co-solvent can have a boiling point that can range from about 150° C. to about 300° C. In yet other examples, a boiling point of the organic co-solvent can range from about 160° C. to about 300° C., from about 180° C. to about 300° C., or from about 200° C. to about 280° C. In some examples, the organic co-solvent may act as a humectant preventing printheads from drying. The organic co-solvent may also act as a coalescing solvent which in conjunction with the natural food-derived fusing compound can provide binding to the particulate build material.

In some examples, the organic co-solvent can be selected from a polyol, an oligoglycol, or a lactam. In another example, the organic co-solvent can be a polyol. In one example, the organic co-solvent can be selected from diols; 1,2 butanediol; 1,2-propanediol; 2,3-butanediol; 1,2-pentanediol; 2-methyl-2,4-pentanediol; 2-methyl-1,3-propanediol; triols; tetrahydrofuran; ethylene glycol dimethyl ether; ethylene glycol diethylene glycol; triethylene glycol; propylene glycol; tripropylene glycol butyl ether; lactams: 2-pyrrolidone; 1-(2-hydroxyl)-2-pyrrolidone; or a combination thereof. In another example, the organic co-solvent can be a diol and the diol can be selected from 1,2 butanediol; 1,2-propanediol; 2,3-butanediol; 1,2-pentanediol; 2-methyl-2,4-pentanediol; 2-methyl-1,3-propanediol; or a combination thereof. In yet another example, the organic co-solvent can be 1,2-butanediol.

In yet other examples, the organic co-solvent can be a food additive permitted carrier solvent. A food additive permitted carrier solvent can be an organic co-solvent that may be safe for contact with food and used to dissolve, dilute, extract, disperse, deliver, or otherwise physically modify a food. Examples of food additive solvents can be located from the governing authority of the county for intended use. For example, food additive permitted carrier solvents identified in the United States of America are classified in the food additive list available from the U.S. Food and Drug Administration as of the date of filing. Examples of food additive permitted carrier solvents may include 1,3 butylene glycol; acetone; benzyl alcohol; castor oil; citric acid esters of diglycerides; citric acid esters of monoglycerides; diglycerides; ethanol; ethyl acetate; glycerol; glycerol diacetate; glycerol triacetate; glycerol tributyrate; hexane; methyl alcohol: methyl ethyl ketone; methylene chloride; monoglyceride citrate; monoglycerides; triethyl citrate; or a combination thereof.

The organic co-solvent can be present in the aqueous liquid vehicle at from about 1 wt % to about 50 wt %, from about 5 wt % to about 35 wt %, from about 10 to about 35 wt %, or from about 5 wt % to about 15 wt %, for example.

In yet other examples, the aqueous liquid vehicle can further include from about 0.1 wt % to about 10 wt % of other liquid components based on a total weight of the fusing agent. The other liquid components can include surfactants, additives that inhibit growth of harmful microorganisms, pH adjusters, viscosity modifiers, sequestering agents, preservatives, etc.

In one example, the aqueous liquid vehicle may include surfactant. The surfactant can include a non-ionic surfactant, a cationic surfactant, and/or an anionic surfactant. Example non-ionic surfactants can include self-emulsifiable, nonionic wetting agents based on acetylenic diol chemistry (e.g., SURFYNOL® SEF from Air Products and Chemicals, Inc., USA), a fluorosurfactant (e.g., CAPSTONE® fluorosurfactants from DuPont, USA), or a combination thereof. In other examples, the surfactant can be an ethoxylated low-foam wetting agent (e.g., SURFYNOL® 440, SURFYNOL® 465, or SURFYNOL® CT-111 from Air Products and Chemical Inc., USA), or an ethoxylated wetting agent and molecular defoamer (e.g., SURFYNOL® 420 from Air Products and Chemical Inc., USA). Still other examples of surfactants can include wetting agents and molecular defoamers (e.g., SURFYNOL® 104E from Air Products and Chemical Inc., USA), alkylphenylethoxylates, solvent-free surfactant blends (e.g., SURFYNOL® CT-211 from Air Products and Chemicals, Inc., USA), water-soluble surfactant (e.g., TERGITOL® TMN-6, TERGITOL® 15S7, and TERGITOL® 1589 from The Dow Chemical Company, USA), or a combination thereof. In other examples, the surfactant can include a non-ionic organic surfactants (e.g., TEGO® Wet 510 from Evonik Industries AG, Germany), a non-ionic secondary alcohol ethoxylate (e.g., TERGITOL® 15-S-5, TERGITOL® 15-S-7, TERGITOL® 15-S-9, and TERGITOL® 15-S-30 all from Dow Chemical Company, USA), or a combination thereof. Example anionic surfactants can include alkyldiphenyloxide disulfonate (e.g., DOWFAX® 8390 and DOWFAX® 2A1 from The Dow Chemical Company, USA), oleth-3 phosphate surfactant (e.g., CRODAFOS™ N3 Acid from Croda, UK), and dioctyl sulfosuccinate sodium salt. Example cationic surfactant can include dodecyltrimethylammonium chloride, hexadecyldimethylammonium chloride, or a combination thereof. In some examples, the surfactant can include a co-polymerizable surfactant. Co-polymerizable surfactants can include polyoxyethylene alkylphenyl ether ammonium sulfate, sodium polyoxyethylene alkylether sulfuric ester, polyoxyethylene styrenated phenyl ether ammonium sulfate, or mixtures thereof. In some examples, the surfactant (which may be a blend of multiple surfactants) may be present in the fusing agent at an amount ranging from 0.01 wt % to 5 wt %, from 0.05 wt % to 2 wt %, or from 0.01 wt % to 1 wt %.

Some example additives that can inhibit the growth of harmful microorganisms can include biocides, fungicides, and other microbial agents. Example antimicrobial agents can include the NUOSEPT® (Ashland Inc., USA), VANCIDE® (R.T. Vanderbilt Co., USA), ACTICIDE® B20 and ACTICIDE® M20 (Thor Chemicals, U.K.), PROXEL® GXL (Arch Chemicals, Inc., USA), BARDAC® 2250, 2280, BARQUAT® 50-65B, and CARBOQUAT®250-T, (Lonza Ltd. Corp., Switzerland), KORDEK® MLX (The Dow Chemical Co., USA), and a combination thereof. In an example, if included, a total amount of antimicrobial agents in the fusing agent can range from 0.01 wt % to 3 wt %.

In some examples, an aqueous liquid vehicle may further include a buffer. The buffer can withstand small changes (e.g., less than 1) in pH when small quantities of a water-soluble acid or a water-soluble base are added to a composition containing the buffer. The buffer can have a pH that can range from to 9.5, from 7 to 9, or from 7.5 to 8.5. In some examples, the buffer can include a poly-hydroxy functional amine. In other examples, the buffer can include potassium hydroxide, 2-[4-(2-hydroxyethyl) piperazin-1-yl] ethane sulfonic acid, 2-amino-2-(hydroxymethyl)-1,3-propanediol (TRIZMA® sold by Sigma-Aldrich, USA), 3-morpholinopropanesulfonic acid, triethanolamine, 2-[bis-(2-hydroxyethyl)-amino]-2-hydroxymethyl propane-1,3-diol (bis tris methane), N-methyl-D-glucamine, N,N,N'N'-tetrakis-(2-hydroxyethyl)-ethylenediamine and N,N,N'N'-tetrakis-(2-hydroxypropyl)-ethylenediamine, beta-alanine, betaine, or mixtures thereof. In yet other examples, the buffer can include 2-amino-2-(hydroxymethyl)-1,3-propanediol (TRIZMA® sold by Sigma-Aldrich, USA), beta-alanine, betaine, or mixtures thereof.

When applied to a layer of the build material, the aqueous liquid vehicle can be capable of wetting the build material and the natural food-derived fusing compound can be capable of penetrating into microscopic pores of the layer (e.g. the spaces between the polymeric particles of the build material). The natural food-derived fusing compound can be activated or cured by heating the natural food-derived fusing compound, (which may be accomplished by heating an entire layer of the build material on at least a portion of which the fusing agent has been selectively applied). When activated or cured, the fusing agent can form an at least substantially continuous network gluing the polymeric particles of the build material together and can form a three-dimensional object or a printed layer of the three-dimensional object.

In some specific examples, the three-dimensional printing kit can include additional fluids or agents, such as coloring agents to impart color, detailing agents to provide more detailed printing at the border of the three-dimensional printed object, or the like. Examples of such fluids are described in greater detail with respect to the multi-fluid kits set forth below.

Multi-Fluid Kits

Figure 2:
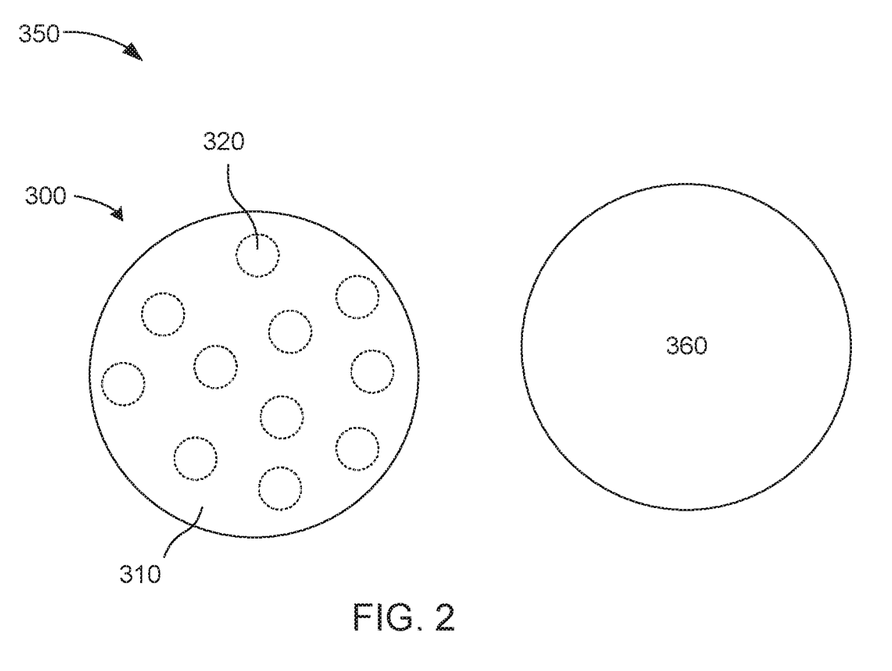
FIG. 2 schematically illustrates an example multi-fluid kit in accordance with the present disclosure.

A multi-fluid kit 350 as shown in FIG. 2 can include a fusing agent 300, and a second fluid agent 360 selected from a detailing agent, a coloring agent, or both. The fusing agent can include an aqueous liquid vehicle 310 and a natural food-derived fusing compound 320 having an absorption peak from about 340 nm to about 780 nm. The second fluid agent can be a coloring agent, which includes an aqueous liquid vehicle similar to that used in the fusing agent and a colorant, such as a pigment and/or a dye. The detailing agent, on the other hand, can include a detailing compound. The detailing compound can reduce a temperature of the build material onto which the detailing agent is applied. In some examples, the detailing agent can be printed around the edges of the portion of the powder that is printed with the fusing agent. The detailing agent can increase selectivity between the fused and unfused portions of the powder bed by reducing the temperature of the powder around the edges of the portion to be fused.

The detailing compound can be water and/or an organic co-solvent that can evaporate at the temperature of the powder bed. In some cases the powder bed can be preheated to a preheat temperature within about 10° C. to about 70° C. of the fusing temperature of the polymeric particles. Depending on the type of polymeric particles used, the preheat temperature can be in the range of about 90° C. to about 200° C. or higher. The detailing compound can be a solvent that can evaporate when it comes into contact with the powder bed at the preheat temperature, thereby cooling the printed portion of the powder bed through evaporative cooling.

In certain examples, the detailing agent can include water, co-solvents, or a combination thereof. In some examples, the detailing agent can be mostly water. For example, the detailing agent can be from about 85 wt % to 100 wt %, or from about 85 wt % to about 99 wt % water. In further examples, the detailing agent can be from about 95 wt % to 100 wt %, or from about 95 wt % to 99 wt % water.

In some example, the detailing agent can include a co-solvent. The co-solvent can be as identified above. In another example, co-solvents for use in the detailing agent can include xylene, methyl isobutyl ketone, 3-methoxy-3-methyl-1-butyl acetate, ethyl acetate, butyl acetate, propylene glycol monomethyl ether, ethylene glycol mono tert-butyl ether, dipropylene glycol methyl ether, diethylene glycol butyl ether, ethylene glycol monobutyl ether, 3-Methoxy-3-Methyl-1-butanol, isobutyl alcohol, 1,4-butanediol, N,N-dimethyl acetamide, and a combination thereof. The co-solvent may be present in the detailing agent at from about 1 wt % to about 15 wt %, at from about 5 wt % to about 10 wt %, at from about 1 to about 10 wt %, or from about 5 wt % to about 15 wt %.

In still further examples, the detailing agent can be substantially devoid of natural food-derived fusing compound or other radiation absorbers. That is, in some examples, the detailing agent can be substantially devoid of ingredients that absorb enough radiation energy to cause particles of the build material to fuse or adhere to one another. In some examples, the detailing agent can include colorants such as dyes or pigments, but in small enough amounts that the colorants do not cause the powder printed with the detailing agent to fuse when exposed to the radiation energy.

The detailing agent can also include ingredients to allow the detailing agent to be jetted by a fluid jet printhead. In some examples, the detailing agent can include jettability imparting ingredients such as those in the fusing agent described above. These ingredients can include a liquid vehicle, surfactant, dispersant, co-solvent, biocides, viscosity modifiers, materials for pH adjustment, sequestering agents, preservatives, and so on. These ingredients can be included in any of the amounts described above.

Three-Dimensional Printing Systems

Figure 3:
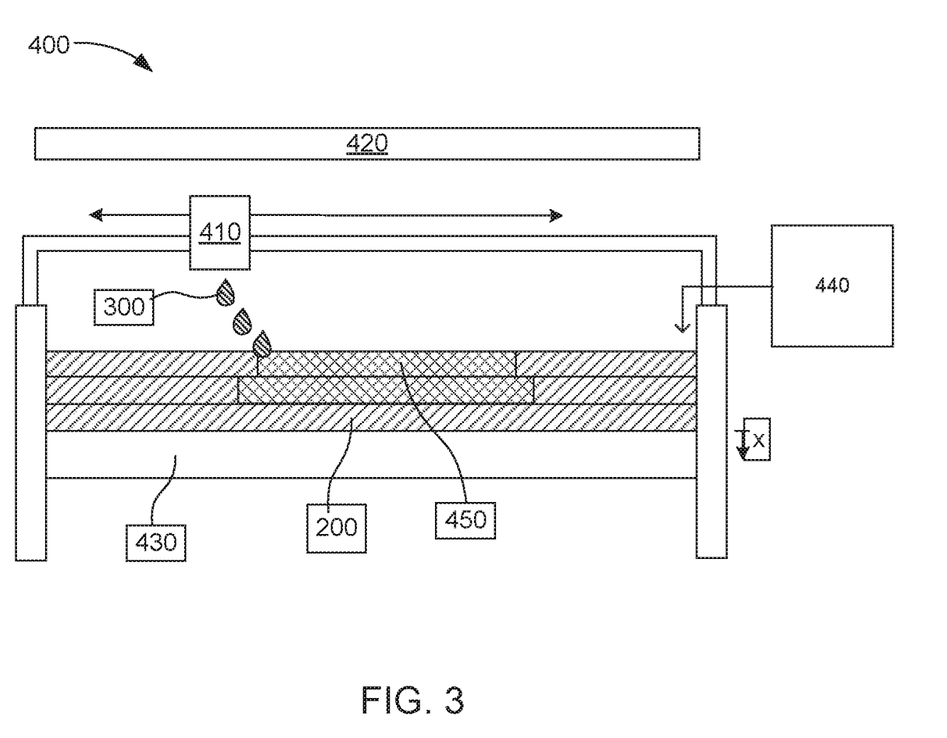
FIG. 3 schematically illustrates an example three-dimensional printing system in accordance with the present disclosure.

A three-dimensional printing system 400 is shown in FIG. 3 by way of example, and can include a build material 200, a fusing agent 300, a fluid applicator 410, and an electromagnetic energy source 420. The build material can include from about 80 wt % to 100 wt % polymeric particles having a D50 particle size from about 10 μm to about 150 μm. The fusing agent can include an aqueous liquid vehicle and a natural food-derived fusing compound having an absorption peak from about 340 nm to about 780 nm. The fluid applicator can be fluidly coupled to or fluidly coupleable to the fluid agent to selectively and iteratively eject the fusing agent onto successive placed individual layers of the build material and the electromagnetic energy source can be positioned to expose the individual layers of the build material to radiation energy to selectively fuse the polymeric particles in contact with the natural food-derived fusing compound to iteratively form a three-dimensional object

450. The build material and fusing agent can be as described above with respect to the three-dimensional printing kit. The three-dimensional printing system can further also include a detailing agent, in an example, the detailing agent can be as described above.

The fluid applicator in further detail can be any type of apparatus capable of selectively dispensing or applying a fluid agent. For example, the fluid applicator can be a fluid ejector or digital fluid ejector, such as an inkjet print head, e.g., a piezoelectric print head, a thermal print head, a continuous print head, etc. The fluid applicator could likewise be a sprayer, a dropper, or other similar structure for applying a fluid agent to the polymeric build material. Thus, in some examples, the application can be by jetting or ejecting from a digital fluid jet applicator, similar to an inkjet pen.

In an example, the fluid applicator can be located on a carriage track, but could be supported by any of a number of structures. In yet another example, the fluid applicator can include a motor (not shown) and can be operable to move back and forth, and the fluid applicator can also be moved front to back as well, to provide both x-axis and y-axis movement over the polymeric build material when positioned over or adjacent to a polymeric build material on a powder bed of a build platform.

In some examples, as further illustrated in FIG. 2, the three-dimensional printing system can further include, in addition to the fluid applicator and three-dimensional printing kit, a build platform 430 that can support a powder bed of build material. The build platform can be positionable to receive the fusing agent from the fluid applicator onto the build material. The build platform can be configured to drop in height (shown at "x"), thus allowing for successive layers of build material to be applied by a spreader 440. The build material can be layered in the build platform at a thickness that can range from about 5 µm to about 1 cm. In some examples, individual layers can have a relatively uniform thickness. In one example, a thickness of a layer of the particulate build material can range from about 10 µm to about 500 µm. In another example, a thickness of a layer of the particulate build material can range from about 500 µm to about 1 cm.

The electromagnetic energy source can be any energy source operable to emit ultraviolet or visible energy having a wavelength that can range from 340 nm to about 780 nm. The electromagnetic energy source can be selected from a UV LED array, a black light, shortwave UV lamp, a halogen lamp, a mercury lamp, or a gas discharge lamp, quartz-halogen lamp, and array of LEDs emitting in visible range. In one example, the electromagnetic energy source can be a UV LED array.

Three-Dimensional Printing Methods

Figure 4:
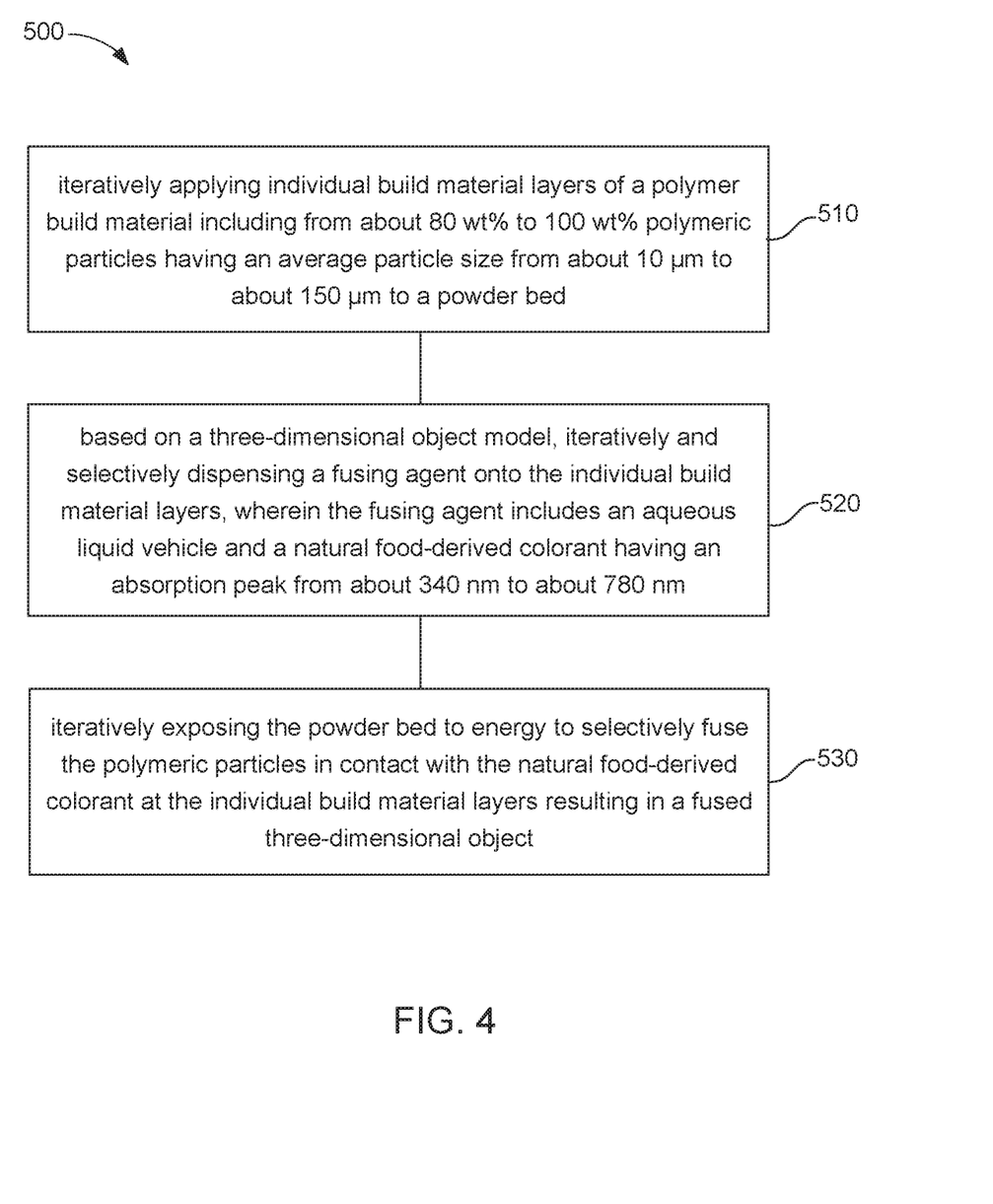
FIG. 4 illustrates an example method for three-dimensional printing in accordance with the present disclosure.

An example method for three-dimensional printing is illustrated at 500 in FIG. 4. The method can include iteratively applying 510 individual build material layers of a polymer build material including from about 80 wt % to 100 wt % polymeric particles having a D50 particle size from about 10 µm to about 150 µm to a powder bed, and based on a three-dimensional object model, iteratively and selectively dispensing 520 a fusing agent onto the individual build material layers, where the fusing agent includes an aqueous liquid vehicle and a natural food-derived fusing compound having an absorption peak from about 340 nm to about 780 nm. The method can further include iteratively exposing 530 the powder bed to energy to selectively fuse the polymeric particles in contact with the natural food-derived fusing compound at the individual build material layers resulting in a fused three-dimensional object.

Following jetting, an electromagnetic energy source can be used to expose the powder bed to the radiation energy and to selectively fuse portions of individual layers of the build material together to form the three-dimensional object. The electromagnetic radiation source can be a static lamp or can travel latterly by carriage along with the fluid ejectors. The electromagnetic energy source can be as described above.

In some examples, the method can further include milling a food source of the natural food-derived fusing compound to have a D50 particle size from about 10 nm to about 5 µm, and dispersing or dissolving the natural food-derived fusing compound in the aqueous liquid vehicle to form the fusing agent. The milling can include placing a food source in a milling machine with a dispersant and a liquid vehicle. The milling machine can be a shaker in one example. The milling can occur for a period of time until the desired D50 particle size is obtained. In some examples, the desired D50 particle size for the natural food-derived fusing compound can be as described above.

In yet other examples, the method can further including holding the build material at an elevated temperature less than the melting temperature of the polymeric particles to remove volatile fusing agent components applied thereon during printing. Heat can be applied to the build material to bring the build material to a temperature near its fusing temperature, making it easier to bring up a temperature enough to generate fusion of the build material. For example, heat may be applied to the build material in the powder bed from the build platform, from above, or to the polymeric build material prior to being spread on the powder bed to preheat the polymeric build material within about 10° C. to about 70° C. of a fusing temperature of the polymeric particles so that less energy may be applied to bring the polymeric particles to their fusing temperature.

In yet other examples, the method can further include iteratively and selectively dispensing a detailing agent onto the individual build material layers. Dispensing a detailing agent onto individual layers laterally at a border between a first area of the build material contacted by the fusing agent and an area of the build material uncontacted by the fusing agent. Printing a detailing agent laterally at a border can increase the definition of the three-dimensional object at the lateral edge and can permit a formation of a smooth edge at the printed three-dimensional object.

In some examples, the fused three-dimensional object formed from the method can be suitable for direct food contact. For example, the fused three-dimensional object formed can form plates, cups, bowls, silverware, and the like. In yet other examples, the fused three-dimensional object formed from the method can be suitable for medical applications. The incorporation of the natural food-derived fusing compound as radiation absorber in the fusing agent can eliminate some of the toxic components in the fusing agent thereby allowing for the formation of objects that are food safe.

DEFINITIONS

It is noted that, as used in this specification and the appended claims, the singular forms "a," "an," and "the" include plural referents unless the context clearly dictates otherwise.

As used herein, "liquid vehicle" refers to water and in some examples, other components, such as, surfactants, solvents, co-solvents, anti-kogation agents, buffers, biocides, sequestering agents, viscosity modifiers, surface-active agents, and the like.

As used herein, "jetting" or "jettable" refers to compositions that are ejectable from jetting architecture, such as ink-jet architecture. Ink-jet architecture can include thermal or piezo pens with printing orifices or openings suitable for ejection of small droplets of fluid. In a few examples, the fluid droplet size can be less than 10 picoliters, less than 20 picoliters, less than 30 picoliters, less than 40 picoliters, less than 50 picoliters, etc.

As used herein, "kit" can be synonymous with and understood to include a plurality of compositions including one or more components where the different compositions can be separately contained in one or more containers prior to and during use, e.g., building a 3D object, but these components can be combined together during a build process. The containers can be any type of a vessel, box, or receptacle made of any material.

As used herein, the term "about" is used to provide flexibility to a numerical range endpoint by providing that a given value may be "a little above" or "a little below" the endpoint. The degree of flexibility of this term can be dictated by the particular variable and determined based on experience and the associated description herein.

As used herein, a plurality of items, structural elements, compositional elements, and/or materials may be presented in a common list for convenience. However, these lists should be construed as though members of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include individual numerical values or sub-ranges encompassed within that range as if numerical values and sub-ranges are explicitly recited. As an illustration, a numerical range of "about 1 wt % to about 5 wt %" should be interpreted to include not only the explicitly recited values of about 1 wt % to about 5 wt %, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

EXAMPLES

The following illustrates examples of the present disclosure. However, it is to be understood that the following are only illustrative of the application of the principles of the present disclosure. Numerous modifications and alternative compositions, methods, and systems may be devised without departing from the spirit and scope of the present disclosure. The appended claims are intended to cover such modifications and arrangements.

Example 1—Preparation of Fusing Agents

Multiple ultraviolet fusing agent formulations were prepared by milling foods to form natural food-derived fusing compound dispersions. A food source, either curcumin or instant coffee, was admixed with a dispersant and an aqueous liquid vehicle as indicated in Table 1.

TABLE 1

Milling Formulations

| Ingredient | Component Type | Dispersion 1 | Dispersion 2 |
| --- | --- | --- | --- |
| Curcumin | Food Source | 10 wt % | — |
| Instant Coffee | Food Source | — | 20 wt % |
| Disperbyk ®-190 (block copolymer dispersant) | Dispersant | 7.5 wt % | 7.5 wt % |
| Polyethylene glycol | Co-solvent | 14 wt % | 14 wt % |
| Isopropyl alcohol | Co-solvent | 2 wt % | 2 wt % |
| Water | solvent | Balance | Balance |

Disperbyk®-190 is available from Byk (Altana Group) (China)

The milling formulations were admixed in a shaker overnight for 20 hours. The final polymer to dispersant ratio for Dispersion 1 was 3.33 and for Dispersion 2 was 6.67.

The natural food derived fusing compound dispersions were then admixed with an aqueous liquid vehicle as shown in Table 2 to form the fusing agent formulations.

TABLE 2

Fusing Agent Formulations

| Ingredient | Component Type | Fusing Agent Formula 1 | Fusing Agent Formula 2 |
| --- | --- | --- | --- |
| Dispersion 1 | Natural Food-derived Fusing Compound | 5 wt % | — |
| Dispersion 2 | Natural Food-derived Fusing Compound | — | 10 wt % |
| Propylene glycol | Co-solvent | 5 wt % | 5 wt % |
| Dioctyl sulfosuccinate sodium salt | Surfactant | 0.3 wt % | 0.3 wt % |
| Water | Solvent | 89.7 wt % | 84.7 wt % |

The above formulations were initially tested for jettability by individually dispensing the formulations as bars printed onto a paper medium using an HP® ink jet printer. The fusing agent formulations did not exhibit any negative effects on decap or nozzle health of the print head.

Example 2—Preparation of Three-Dimensional Objects

In order to test the fusing capability of the fusing agent formulations from Table 2 above, rectangular three-dimensional object layers (15×40 mm in size) were printed on a single 300 µm thick layer of a polyamide-12 powder spread on a glass substrate. The polyamide-12 powder was held at an elevated temperature of about 30° C. The fusing agents were independently printed at an ink density of 18 picoliters per 600th of an inch (per single pass), which corresponds to a fusing agent to polymeric build material weight ratio of about 1:300. The substrate with polyamide-12 powder and the fusing agent printed thereon was placed under a 395 nm UV-LED light array capable of emitting UV radiation at maximum intensity (100% intensity) of 12 W/cm$^2$ for up to a few seconds. Specifically, the Fusing Agent Formula 1 was applied in duplicate and fused by exposure for 0.8 seconds and 0.6 seconds under the UV-LED light array. Fusing Agent Formula 2 was applied in triplicate and fused by exposure for 1 second, 0.8 seconds, and 0.6 seconds under the UV-LED light array.

All of the three-dimensional printed object layers fully fused to form a solid object layer following exposure to the UV-LED light array and were capable of being moved. Areas of the polyamide-12 powder which were not printed with the fusing agent did not solidify or fuse to form a solid object layer, but rather remained as the polyamide-12 powder. The of the three-dimensional printed objects varied.

While the present technology has been described with reference to certain examples, it is appreciated that various modifications, changes, omissions, and substitutions can be made without departing from the spirit of the disclosure. It is intended, therefore, that the disclosure be limited only by the scope of the following claims.

What is claimed is:

1. A three-dimensional printing kit, comprising:
    a build material powder including from about 80 wt % to 100 wt % of polymeric particles having a D50 particle size from about 10 μm to about 150 μm, wherein the polymeric particles are selected from the group consisting of polyacetal particles, polyacrylate particles, polybutylene terephthalate particles, polycarbonate particles, polyester particles, polyether ketone particles, polyethylene terephthalate particles, polyethylene particles, polypropylene particles, polystyrene particles, polyurethane particles, thermoplastic polyamides particles, thermoplastic polyurethane particles, copolymer particles thereof, and a mixture thereof; and
    a fusing agent contained separately from the build material powder and including an aqueous liquid vehicle and a natural food-derived fusing compound dispersed in the aqueous liquid vehicle, wherein the natural food-derived fusing compound is in the form of dispersed particles having a D50 particle size ranging from about 10 nm to about 5 μm and has an absorption peak from about 340 nm to about 780 nm.

2. The three-dimensional printing kit of claim 1, wherein the natural food-derived fusing compound has an absorbance of larger than 0.3.

3. The three-dimensional printing kit of claim 1, wherein the natural food-derived fusing compound is selected from the group consisting of allspice, annatto, basil, berbere, black garlic, brown sugar, caraway seeds, cardamom, cayenne red pepper, celery seeds, chili powder, cinnamon, cloves, coffee grinds, coriander, cumin, curcumin, curry powder, ginger, ground mustard, ground peppercorns, ground sage, ground tea leaves, ground thyme, keratin, mace, marjoram, mustard seeds, nutmeg, oregano, paprika, red pepper, sage, star anise, tabil, turmeric, and a combination thereof.

4. The three-dimensional printing kit of claim 1, wherein the natural food-derived fusing compound is selected from the group consisting of coffee grinds, curcumin, turmeric, and a combination thereof.

5. The three-dimensional printing kit of claim 1, wherein the fusing agent includes:
    from about 60 wt % to about 94 wt % of water;
    from about 5 wt % to about 35 wt % of an organic co-solvent; and
    from about 0.1 wt % to about 20 wt % of the natural food-derived fusing compound.

6. The three-dimensional printing kit of claim 1, wherein the aqueous liquid vehicle includes water and an organic co-solvent, wherein the organic co-solvent consists of food additive permitted carrier solvents.

7. The three-dimensional printing kit of claim 1, further comprising a detailing agent comprising a detailing compound, wherein the detailing compound reduces a temperature of the build material onto which the detailing agent is applied.

8. The three-dimensional printing kit of claim 1 wherein the natural food-derived fusing compound are milled particles.

9. The three-dimensional printing kit of claim 1, wherein the aqueous liquid vehicle of the fusing agent includes from about 60 wt % to about 95 wt % of water.

10. The three-dimensional printing kit of claim 1, wherein the aqueous liquid vehicle of the fusing agent includes a surfactant.

11. The three-dimensional printing kit of claim 1, wherein the D50 particle size of the natural food-derived fusing compound ranges from about 10 nm to about 800 nm.

12. A method for three-dimensional printing, the method comprising:
    iteratively applying individual build material layers of a polymer build material powder including from about 80 wt % to 100 wt % of polymeric particles having a D50 particle size from about 10 μm to about 150 μm to a powder bed, wherein the polymeric particles are selected from the group consisting of polyacetal particles, polyacrylate particles, polybutylene terephthalate particles, polycarbonate particles, polyester particles, polyether ketone particles, polyethylene terephthalate particles, polyethylene particles, polypropylene particles, polystyrene particles, polyurethane particles, thermoplastic polyamides particles, thermoplastic polyurethane particles, copolymer particles thereof, and a mixture thereof;
    based on a three-dimensional object model, iteratively and selectively dispensing a fusing agent onto the individual build material layers, wherein the fusing agent includes an aqueous liquid vehicle and a natural food-derived fusing compound in the form of dispersed particles having a D50 particle size ranging from about 10 nm to about 5 μm and an absorption peak from about 340 nm to about 780 nm; and
    iteratively exposing the powder bed to energy to selectively fuse the polymeric particles in contact with the natural food-derived fusing compound at the individual build material layers resulting in a fused three-dimensional object.

13. The method of claim 12, further including:
    milling a food source of the natural food-derived fusing compound to have the D50 particle size from about 10 nm to about 5 μm; and
    dispersing the natural food-derived fusing compound in the aqueous liquid vehicle to form the fusing agent.

14. The method of claim 12, further including holding the polymer build material at an elevated temperature less than the melting temperature of the polymeric particles to remove volatile fusing agent components applied thereon during the three-dimensional printing.

15. The method of claim 12, wherein the fused three-dimensional object is suitable for direct food contact.

* * * * *